United States Patent
Bouwers

(10) Patent No.: US 8,830,898 B2
(45) Date of Patent: Sep. 9, 2014

(54) FAST INTER SYSTEM PUSH TO TALK OPERATION

(75) Inventor: Egbert Bouwers, Hoogeveen (NL)

(73) Assignee: Rohill Technologies B.V., Hoogeveen (NL)

( * ) Notice: Subject to any disclaimer, the term of this patent is extended or adjusted under 35 U.S.C. 154(b) by 457 days.

(21) Appl. No.: 13/061,872

(22) PCT Filed: Sep. 2, 2009

(86) PCT No.: PCT/NL2009/050524
§ 371 (c)(1),
(2), (4) Date: Apr. 11, 2011

(87) PCT Pub. No.: WO2010/027257
PCT Pub. Date: Mar. 11, 2010

(65) Prior Publication Data
US 2011/0305188 A1    Dec. 15, 2011

(30) Foreign Application Priority Data
Sep. 2, 2008 (EP) .................................. 08163488

(51) Int. Cl.
| | |
|---|---|
| *H04B 7/14* | (2006.01) |
| *H04W 4/00* | (2009.01) |
| *H04L 12/66* | (2006.01) |
| *G06F 15/16* | (2006.01) |
| *H04W 4/10* | (2009.01) |
| *H04W 76/00* | (2009.01) |
| *H04W 72/00* | (2009.01) |
| *H04W 92/02* | (2009.01) |

(52) U.S. Cl.
CPC .............. *H04W 4/10* (2013.01); *H04W 72/005* (2013.01); *H04W 76/005* (2013.01); *H04W 92/02* (2013.01)

USPC .......... 370/315; 370/329; 370/338; 370/341; 370/352; 709/204; 709/228; 709/230

(58) Field of Classification Search
USPC ......... 370/329, 338, 341, 352; 455/58.1, 404, 455/422, 517–527; 709/204, 228, 230
See application file for complete search history.

(56) References Cited

U.S. PATENT DOCUMENTS

| | | | | |
|---|---|---|---|---|
| 5,881,313 | A * | 3/1999 | Ramakrishnan et al. | ........ 710/40 |
| 6,188,882 | B1 * | 2/2001 | Tarkiainen et al. | ........ 455/404.1 |

(Continued)

OTHER PUBLICATIONS

Siemens AG—Juergen Carstens; Reduction of "Right to Speak Request and Response Delay" in PoC; Nov. 1, 2006; pp. 1.

*Primary Examiner* — Jung Park
*Assistant Examiner* — Chuong M Nguyen
(74) *Attorney, Agent, or Firm* — Jordan IP Law, LLC; Todd A. Vaughn

(57) ABSTRACT

A method for establishing a press-to-talk (PTT) session between a first terminal serviced by a first communication system and a second terminal serviced by a second communication system, in which the first communication system and the second communication system are interconnected by a transmission link. The method includes receiving a transmission demand message (TX-DEMAND) from the first terminal, sending a transmission granted message (TX-GRANTED) to the first terminal and a transmission demand message (TX-DEMAND) to the second communication system if a communication channel is locally available for the press-to-talk session, receiving transmission packets from the first terminal and relaying the transmission packets to the second communication system, and then, continuing relaying transmission packets to the second communication system if a transmission granted message (TX-GRANTED) from the second communication system in reply to the transmission demand message (TX-DEMAND) is received.

26 Claims, 3 Drawing Sheets

(56) References Cited

U.S. PATENT DOCUMENTS

| | | |
|---|---|---|
| 6,950,399 B1 * | 9/2005 | Bushmitch et al. ............ 370/236 |
| 7,277,423 B1 * | 10/2007 | Welch ........................... 370/352 |
| 2004/0151138 A1 * | 8/2004 | Paltemaa ....................... 370/329 |
| 2004/0224678 A1 | 11/2004 | Dahod et al. |
| 2005/0203998 A1 * | 9/2005 | Kinnunen et al. ............ 709/204 |
| 2008/0200162 A1 * | 8/2008 | Chowdhury et al. ....... 455/422.1 |

* cited by examiner

FAST INTER SYSTEM PUSH TO TALK OPERATION

CROSS REFERENCE TO PRIOR APPLICATIONS

The present application is a National Stage Application of PCT International Application No. PCT/NL2009/050524 (filed on Sep. 2, 2009), under 35 U.S.C. §371, which is hereby incorporated by reference in its entirety.

FIELD OF THE INVENTION

The present invention relates to a method for establishing a press-to-talk (PTT) session between a first terminal serviced by a first communication system and a second terminal serviced by a second communication system, in which the first communication system and second communication system are interconnected by a transmission link. The method comprises receiving a transmission demand message (TX-DEMAND) from the first (i.e. initiating) terminal. Furthermore, the present application relates to a communication system implementing this method.

BACKGROUND OF THE INVENTION

In prior art systems, a central management function is implemented in either the first or second communication system. If implemented in the first communication system the first terminal may be granted the PTT session (if resources are available) almost directly. However, when the central management function is implemented in the second communication system, the first terminal will have to wait a long period before receiving a grant of a PTT session, due to the required double traverse of the transmission link. If the delay of the transmission link is long (e.g. when using satellite communications), this long period may be longer than acceptable.

SUMMARY OF THE INVENTION

The present invention seeks to provide an improved method and system for PTT sessions in interconnected networks, in which delays introduced by the transmission link are not noticeable for the users of the terminals.

According to the present invention, a method according to the preamble defined above is provided, in which the method further comprises sending a transmission granted message (TX-GRANTED) to the first terminal and a transmission demand message (TX-DEMAND) to the second communication system if a communication channel is locally available for the press-to-talk session, receiving (subsequent) transmission packets from the first terminal and relaying the transmission packets to the second communication system, and if receiving a transmission granted message (TX-GRANTED) from the second communication system in reply to the transmission demand message (TX-DEMAND), continuing relaying transmission packets to the second communication system. In the present method embodiment, no specific management role is assigned to either the first or second communication system, and the first communication system will not wait for a transmission granted message from the second communication system. Here, the check whether a communication channel is locally available encompasses a check that the first communication system is not busy and resources towards the second communication system (i.e. in the first communication system and the transmission link) are available. This allows to establish a PTT session between the first and second terminal much quicker, and a possible long delay introduced by the transmission link (e.g. using satellite communication) is not noticeable to the user of the first terminal.

Upon reception of the transmission granted message from the first communication system, the first terminal may be arranged to provide an indication to the user of the first terminal that he/she can start speaking, e.g. using auditory or visual indicators. Also, if receiving a transmission ceased message (TX-CEASED) from the first terminal, the first communication system can signal the transmission ceased message (TX-CEASED) to the second communication system, such that the receiving party (user of second terminal) is notified that the PTT session has ended.

A PTT session may be initiated from the first terminal to only a single second terminal serviced by the second communication system, but also to a group of terminals, including one ore more terminals serviced by either the second communication system or the first communication system.

In a further embodiment, the method further comprises if receiving a further transmission demand message (TX-DEMAND) from the second communication system having a time stamp value later than a time stamp value in the transmission demand message (TX-DEMAND) forwarded for the first terminal, continuing relaying transmission packets to the second communication system. The first communication can then establish that the PTT session initiated by the first terminal was first and can be maintained. Furthermore, the first communication system may respond to the transmission demand message from the second communication system by sending a transmission rejected message (TX-REJECTED).

In an even further embodiment, the method further comprises if receiving a further transmission demand message (TX-DEMAND) from the second communication system having a time stamp value earlier than a time stamp value in the transmission demand message (TX-DEMAND) forwarded for the first terminal, halting relaying transmission packets to the second communication system, sending a transmission granted message (TX-GRANTED) to the second communication system, and relaying transmission packets from the second communication system to the first terminal. In this case, the PTT session initiated by the first terminal apparently was later, and should be interrupted, while also establishing the further PTT session apparently initiated by a second terminal serviced by the second communication system.

The above embodiments are all symmetrical when viewed over the entire inter-network PTT communications: the second communication system may also implement the same method steps as mentioned above, resulting in a robust and reliable inter network PTT session establishment and control.

The method may in a further embodiment comprise if receiving a transmission rejected message (TX-REJECTED) from the second communication system: halting relaying transmission packets to the second communication system, and relaying the transmission rejected message (TX-REJECTED) to the first terminal. The first terminal will then indicate that the PTT session cannot be set up (e.g. using auditory/visual indicators) and instigate the user to release the PTT key.

In a further set of embodiments, the method further comprises if receiving a transmission demand message (TX-DEMAND) from the second communication system having a time stamp value equal to a time stamp value in the transmission demand message (TX-DEMAND) forwarded for the first terminal, continuing the PTT session based on priority scheduling. Priority scheduling may comprise checking priorities assigned to the communication systems serving the initiating terminals associated with the PTT sessions. Also, priority scheduling may comprises checking priorities assigned to the initiating terminals associated with the PTT sessions. This allows to handle situations where PTT sessions are initiated almost simultaneously, e.g. within a resolution of time stamp values used in the communication systems.

One or more message types being received or sent by the first communication system (TX-DEMAND; TX-GRANTED; TX-REJECTED; TX-CEASED) may comprise an identification of the first terminal. This allows to correctly interpret messages sent and received using the present method embodiments by all elements (i.e. the first/second communication system and first/second terminal). In a further embodiment, one or more message types being sent or received by the first communication system comprise a PTT session reference number. This allows to correlate related messages, and e.g. allows to use multi-channel systems, in which multiple PTT sessions exist simultaneously.

The PTT session may relate to an individual call or a group call, i.e. a call may exist from the first terminal to a second terminal, or from a first terminal to a group of terminals in either system.

In a further embodiment, the present method further comprises repeating sending the transmit demand (TX-DEMAND) to the second communication system according to a specific interval in one embodiment, or, in a further embodiment if not receiving a transmission granted message (TX-GRANTED) from the second communication system in reply to the transmission demand message (TX-DEMAND) within a time period. This will make the communication system overall more robust.

A protocol as used between the first communication system and the first terminal or a protocol as used between the second communication system and the second terminal is adapted to the respective air interface in a further embodiment. This may result in different types of messages or nomenclature in the messages.

In a further aspect, the present invention relates to a communication system connectable to a further communication system using a transmission link, the communication system serving a first terminal for push-to-talk (PTT) sessions with a second terminal serviced by the further communication system, the communication system being arranged to implement the method according to any one of the above described embodiments. The (first) communication system and further (second) communication system are again symmetrical.

BRIEF DESCRIPTION OF THE DRAWINGS

The present invention will be discussed in more detail below, using a number of exemplary embodiments, with reference to the attached drawings, in which.

DETAILED DESCRIPTION OF THE INVENTION

Figure 1:
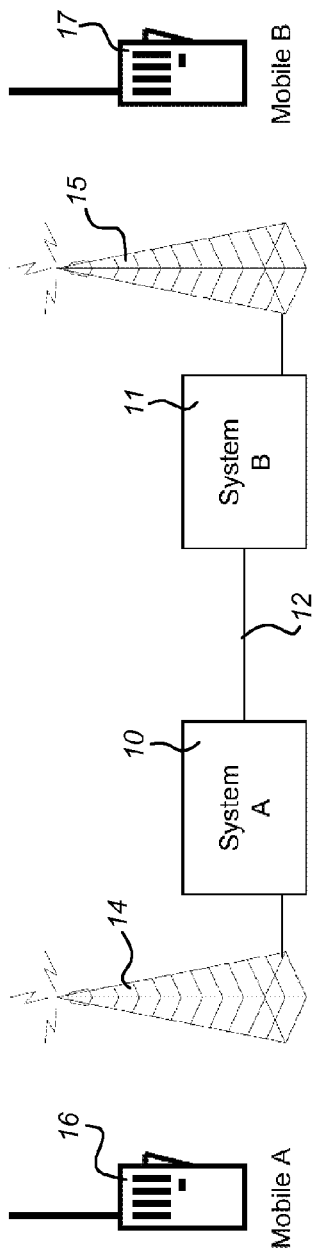
FIG. 1 shows a general block diagram of an interconnected press-to-talk communications system.

A general block diagram of interconnected communication systems is shown in FIG. 1. A first communication system 10 and a second communication system 11, e.g. wireless communication systems, are interconnected by a transmission link 12. The transmission link 12 may be a physical link (copper, fiber) or a wireless link (satellite link, directed antenna link). Each communication system 10, 11 is in this example connected to one or more associated antenna systems 14, 15, e.g. Base Stations in a digital trunked radio network. Each antenna system 14, 15 is in communication with a terminal (e.g. mobile station 16, 17 or a group of mobile stations 16, 17). The embodiments described here may be applied to digital trunked radio networks and wireless packet data networks for the purpose of transmitting speech, e.g. press-to-talk (PTT) over cellular (PoC). The transmission link 12 may (especially in the case of satellite links) introduce a noticeable delay in communication between terminals 16 and 17.

Push to talk systems are widely used for certain types of communication (Private Mobile Radio, PMR) where reliability of operation is important, e.g. for mission critical operations for military purposes or for emergency purposes. PTT systems use simplex communication channels, e.g. a single assigned time slot in a TDMA communication system. Only after releasing a talk key on the terminal 16, 17, another terminal 16, 17 can start sending. Furthermore, groups may be established, e.g. by assigning group number to one or more terminal 16, 17 in a single communication system 10, 11 or in multiple communication systems 10, 11. The present invention may be applied in synchronous transmission links, e.g. ISDN-PRI or E1 links, but also in systems using packet data links, such as using Internet Protocol links (IP, or even IP/UDP links).

In conventional PTT systems, a delay introduced somewhere in the transmission path may severely hamper use of the PTT communication channel. Normally, one communication system (e.g. the first communication system 10) takes the role of transmission manager in an inter-network communication situation. When setting up a PTT session from a mobile station 17 serviced by a remote communication system (e.g. the second communication system 11) which is not the transmission manager, requests have to be sent from mobile station 17 via the second communication system 11 to the first communication system 10. When resources are available for setting up the PTT session, the first communication system 10 can notify the second communication system 11, which in turn signals the mobile station 17 that the user can start to talk. This would include transmissions over the transmission link 12 twice, which may introduce long delays in the process of setting up the PTT session. E.g. in the case of a satellite transmission link 12, this may add up to 600 msec of additional delay. Furthermore, if the transmission link would fail, the first communication system 10 acting as transmission manager cannot be reached from the second communication system, effectively also prohibiting PTT communications between (a group of) mobile stations 17 connected to the second communication system 11.

Figure 2:
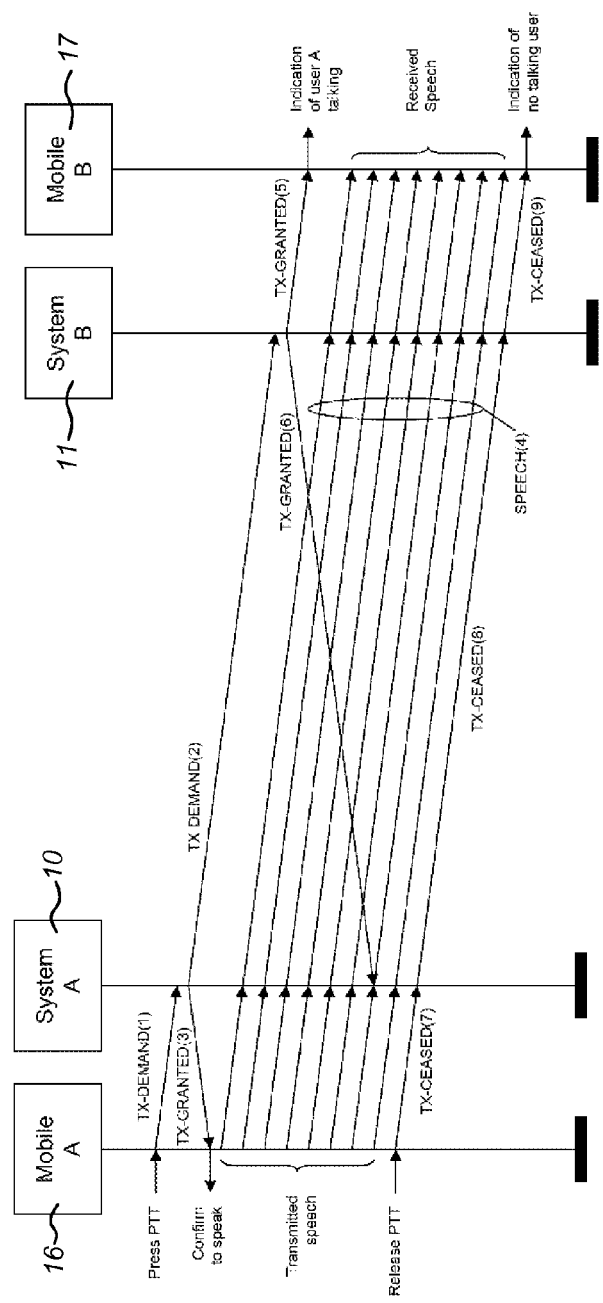
FIG. 2 shows a schematic flow and timing diagram of a first example implementing a present invention embodiment.

According to the present invention, each communication system 10, 11 acts as a transmission manager on its own. In FIG. 2 a schematic flow and time diagram is shown of a situation in which a first terminal (mobile station 16) in communication with a first communication system 10 initiates a PTT session to a second terminal (mobile station 17) served by a second communication system 11. First, the user of the first terminal 16 presses the press-to-talk key, which causes the first terminal 16 to send a transmit demand message (TX-DEMAND (1)). Upon reception, the first communication system checks whether the associated channel/group is not busy, and whether resources are available locally (including on the transmission link 12). If affirmative, the first communication system 10 immediately forwards the transmit demand message to the second communication system 11 (TX-DEMAND (2)), and sends a grant message to the requesting first terminal 16 (TX-GRANTED (3)). The reception of the TX-GRANTED (3) message causes the first terminal 16 to indicate to the user that he can start to speak (e.g. using a specific tone or audible signal, or a visual signal).

The user of the requesting first terminal 16 now starts talking, causing the first terminal 16 to start sending speech packets to the first communication system 10. The first communication system 10 forwards the speech packets to the second communication system 11 (indicated as subsequent transmissions of SPEECH (4) messages).

The second communication system 11 also acts as a local transmission manager. Upon receiving the TX-DEMAND (2) message from the first communication system 10, the second communication system 11 checks whether the requested channel/group is not busy and whether resources are available. If so, the second communication system 11 sends a message to the receiving terminal 17 (TX-GRANTED (5)) which causes the second terminal 17 to indicate to its user that the user of first terminal 16 will start talking (again using auditory and/or visual indicators). Also, the second communication system 11 sends a message (TX-GRANTED (6)) to the first communication system, indicating that the transmission from first terminal 16 to second terminal 17 is granted by the second communication system 11 as well.

This second message TX-GRANTED (6) is received by the first communication system 10 when it is already retransmitting the speech data packets (SPEECH (4)). Upon receipt of the TX-GRANTED (6) message from the second communication system 11, the first communication system simply continues with the ongoing PTT session. As the user of the first terminal 16 doesn't have to wait until the confirmation originating from the second communication system 11, it is possible to start the actual PTT session quicker.

When the user of the first terminal 16 releases the PTT key, the first terminal sends a message to the first communication system 10 (TX-CEASED 7) indicating the end of the PTT session. The first communication system 10 forwards this message to the second communication system 11 (TX-CEASED (8)), which in turn forwards this message to the second terminal 17 (TX-CEASED (9)). The second terminal 17 indicates the end of the PTT session upon receipt of this message, again using auditory and/or visual indicators.

The first and second communication systems 10, 11 may furthermore be arranged to repeat a sent TX-DEMAND message according to a specific interval, or when a corresponding TX-GRANTED (or TX-REJECTED, see below) message is not received within a certain time period, e.g. a bit longer than twice the transmission delay over the transmission link 12. This will make the entire PTT implementation more robust.

Figures 3, 4:
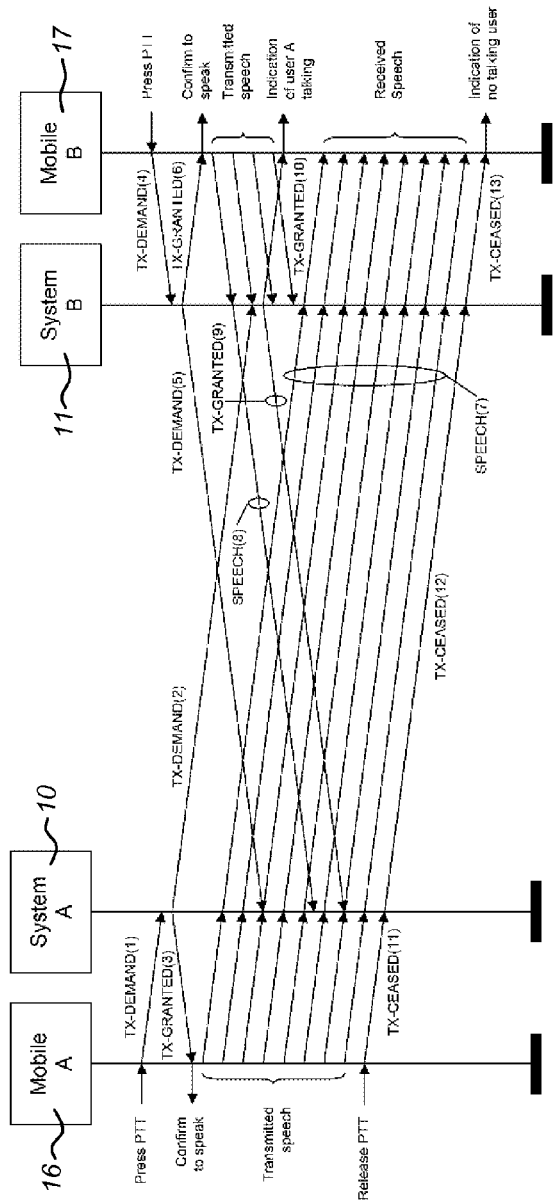
FIG. 3 shows the composition of various messages used in the present invention embodiments.
FIG. 4 shows a schematic flow and timing diagram of a second example implementing a present invention embodiment.

FIG. 3 shows the contents of the messages as used in the embodiment described above (and also used in further embodiments described below). The TX-DEMAND message comprises an identification field with an identification of the terminal requesting a PTT session, a time stamp field, and a reference field for this PTT session. The reference field allows the various elements involved in the PTT session (first and second terminal 16, 17, first and second communication system 10, 11) to relate messages to each other. This allows to use e.g. multi-channel systems, in which several communication channels exist in a same frequency channel or band. The elements involved are arranged to increase the value in this reference field for each new PTT session started. Optionally, also a Called ID field is included in this message, allowing to address a specific terminal 16, 17 (individual ID) or a group of first and second terminals 16, 17 (Group ID) to be included in the PTT session. In general, the PTT session in the present invention embodiments may relate to an individual call or a group call.

The TX-GRANTED message includes again a reference field, and the optional Called ID field, as well as a field indicating an identification (ID) of the terminal 16 allowed to speak (talking ID). The TX-CEASED message also includes the reference field and the optional Called ID field, as well as an identification (ID) field of the terminal 16 from which the TX-CEASED message originates. The SPEECH messages comprise the reference field, as well as the actual speech data. It is possible to leave out the Called ID and the talking ID (ID requesting to talk, ID allowed to talk, . . . ) in some of the messages transferred over the link 12 and to use the reference field value to correlate these fields when the information is already known in both the first and second communication systems 10, 11.

A further message (TX-REJECTED) may be used to indicate that a request from a terminal 16 for a PTT session is not granted. Such a message may e.g. be sent by the first communication system 10 after reception of a TX-DEMAND message from first terminal 16, e.g. in the case that all possible communication channels associated with the first communication system 10 are busy. Such a TX-REJECTED message causes the first terminal 16 receiving that message to provide an associated (auditory or visual) indication to the user of the first terminal 16.

The protocol used between each of the first terminal 16 and first communication system 10 and the second terminal 17 and second communication system 11 may be dependent on the type of air interface present, as a result of which the names of the messages and content thereof may change.

In FIG. 4, a schematic flow and time diagram is shown of a situation wherein a first terminal 16 and a second terminal 17 serviced by two different communication systems 10, 11 try to initiate a PTT session at almost the same time. The first terminal 16 starts transmission a bit earlier than the second terminal 17. For the first terminal, the sequence of messages is virtually the same as in the embodiment discussed above in relation to FIG. 2. After receiving the TX-GRANTED message from the first communication system 10, the first terminal again starts sending SPEECH massages, which are forwarded by the first communication station 10 to the second communication station 11, until the TX-CEASED message is transmitted by the first terminal 16 after release of the PTT key by the user. These messages are now referenced different (SPEECH (7) and TX-CEASED (11), (12) and (13), respectively) due to intervening messages originating from the second terminal 17 and second communication system 11.

As the first terminal 16, the user of the second terminal 17 presses the PTT key to initiate a PTT session. This is notified to the second communication station using TX-DEMAND message (4). The second communication system 11 checks whether the channel/group is not busy and whether resources are available for the requested PTT session. At that moment in time, the second communication system 11 is not aware of the PTT session initiated by the first terminal 16, and thus forwards the TX-DEMAND (5) message for second terminal 17 to the first communication system 10. Also, the second terminal 17 is notified of the approval using TX-GRANTED (6) message. This causes the second terminal 17 to indicate to the user that the PTT session may be started (again using auditory and/or visual indicators). Speech packets (SPEECH (8) messages) formed by the second terminal 17 and sent subsequently to the second communication system 11 and forwarded to the first communication system 10.

Just after forwarding the first SPEECH (8) message to the first communication system 10, the second communication system 11 receives the TX-DEMAND (2) message from the first communication system. Now, the second communication system 11 detects a possible conflict, and checks the time stamp values in the time stamp fields in the related PTT sessions. After noticing that the PTT session associated with the first terminal 16 was started earlier than the PTT session associated with the second terminal 17, the second communication notifies the first communication system using the TX-GRANTED message (9). Subsequently, the second communication system 11 will stop relaying the SPEECH (8) messages to the first communication system 10. Also, the second communication system 11 notifies the second terminal 17 using the TX-GRANTED (10) message that the PTT session with the first terminal 16 is active, e.g. using a tone or other type of warning signal. The second terminal 17 will then stop sending the SPEECH (8) data packets, and the user will release the PTT key, and start receiving the SPEECH (8) data packets from the first terminal 16.

As indicated in the example of FIG. 4, the first communication system 10 is able to retrieve the identification and time stamp values from the TX-DEMAND (5) message and compare these with the values of the PTT session associated with the first terminal 16. As indicated in the example one SPEECH (7) packet will reach the first communication system 10 before the second communication system 11 halts sending these speech packets. Upon reception, the first communication system 10 extracts the reference field value of the SPEECH (7) packet and correlates this with the TX-DEMAND (5) message received earlier. As the first terminal 16 was earlier, the first communication system 10 will not forward the SPEECH (7) packet to the first terminal 16.

Figure 5:
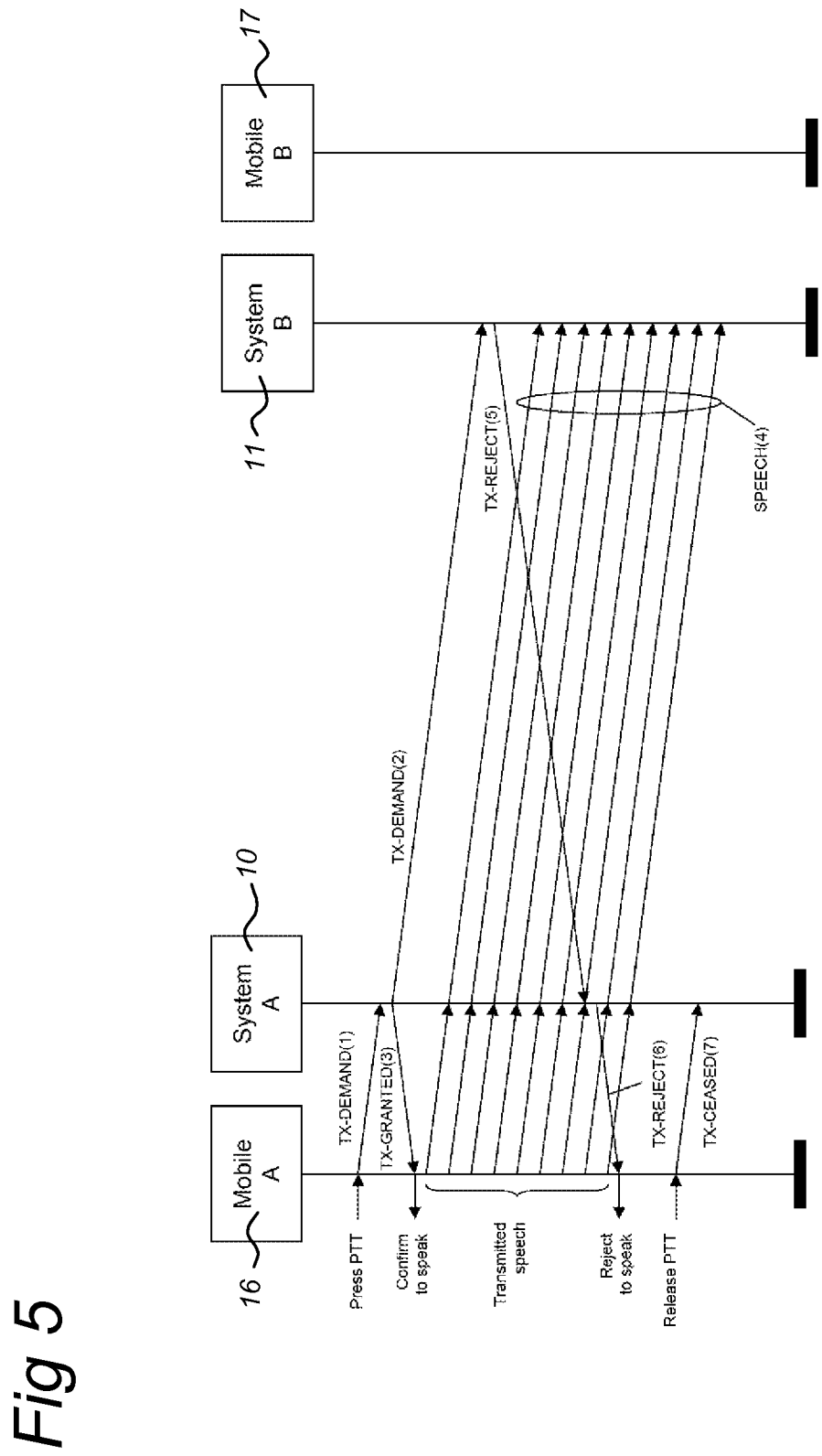
FIG. 5 shows a schematic flow and timing diagram of a third example implementing a present invention embodiment.

In FIG. 5 an even further possible situation is illustrated, in which in the second communication system 11 insufficient resources are available for establishing the PTT session with second terminal 17. The start of the PTT session by first terminal 16 is similar to the session illustrated with reference to FIG. 2, up onto receipt of the TX-DEMAND (2) message from the first communication system 10 by the second communication system 11. At that moment (while first terminal 16 already is sending the SPEECH (4) packets), the second communication system 11 notes that no resources are available (e.g. the second terminal 17 is engaged in a group communication which is restricted to a number of terminals serviced by the second communication system 11). Now, the second communication system 11 sends a TX-REJECT (5) message back to the first communication system 10. Upon receipt of the TX-REJECT (5) message, the first communication system 10 notifies the first terminal 16 using a TX-REJECT (6) message. The first terminal 16 is arranged to notify its user upon reception of a TX-REJECT message, again using auditory and/or visual indicators. As a result, the user will release the PTT key, and the first terminal 16 send a TX-CEASED (7) message to the first communication system 10.

For the person skilled in the art it will be clear that the behavior of the above embodiments is symmetrical. I.e. the roles of first terminal 16, first communication system 10 and second terminal 17, second communication system 11, respectively can be interchanged. Also it is possible that more than two communication systems 10, 11 are involved in PTT session with associated terminals 16, 17. Each of the communication systems is then arranged to receive, evaluate and respond to the various messages described above in relation to the examples of FIGS. 2, 4 and 5.

Furthermore, the PTT session may involve individual PTT sessions involving transmission of speech from a first terminal 16 to a second terminal 17, but also may involve group calls, wherein a first terminal 16 communicates with a group of terminals 16, 17 which group may involve terminals 16, 17 serviced both by the first communication system 10 and the second communication system 11.

The time stamp values which are recorded in the TX-DEMAND messages should be of a sufficient time resolution to enable successful negotiation in case of (almost) simultaneous PTT session requests. The time resolution is in an exemplary embodiment 10 ms or less, e.g. 1 ms. Certain transmission techniques, such as TDMA systems, require that the first and second communication system are time synchronized. In case of almost simultaneous PTT session requests, this could result in identical time stamp values.

In a further embodiment, this problem is resolved using a prioritization scheme. Each of the communication systems is assigned a unique priority value, and the communication system having the highest priority value will take control and continue to grant a PTT session, while a PTT session associated with the lower priority communication system will be interrupted.

Such a prioritization scheme is also applied in a further embodiment for each of the terminals 16, 17 available in a inter network communication system. E.g. in military operations, a terminal 16 may be assigned a higher priority value than other terminals 16, 17. The priority value of a terminal 16, 17 may e.g. be based on an operational role of the associated users.

When a PTT session is active, the first or second communication system 10, 11 may also be arranged to assess a priority value of that PTT session when receiving a new TX-DEMAND from one of the terminals 16, 17. The PTT sessions may e.g. be assigned a normal priority, high priority or emergency value, and a new PTT session may overrule an existing PTT session. If this is the case, the associated communication system 10, 11 will react by granting the new PTT session (using a TX-GRANTED message to the other communication system 10, 11) and interrupting the existing session using a TX-GRANTED message to the sending terminal 16, 17.

For reliability reasons, the first communication system 10 may be arranged to guard a timing interval for receiving a TX-GRANTED message after sending a TX-DEMAND message. If the timing interval lapses, the first communication system 10 will resend the TX-DEMAND message to the second communication system 11. In case of an important PTT session (critical messages of which reception must be guaranteed), the first communication system 10 may interrupt the ongoing PTT session, and notify the initiating terminal 16. The user will then know the transmission is probably not received, and can initiate a new PTT session.

Using the present invention embodiment, a much more robust PTT communication system is provided allowing inter network operation. Even in the case that one of the communication networks is unavailable or off line, the present invention allows communications at least locally between the terminals 16, 17 connected to the first or second terminal 10, 11 still in operation.

The present invention has been described above with reference to exemplary embodiments. Alternatives and modifications may be possible which are within the scope of the present invention, which is defined by the claims as appended.

What is claimed is:

1. A method for establishing a press-to-talk (PTT) session between a first terminal serviced by a first communication system and a second terminal serviced by a second communication system, in which the first communication system and the second communication system are interconnected by a transmission link, the method comprising:
- receiving a transmission demand message (TX-DEMAND) from the first terminal at the first communication system;
- sending, at the first communication system, a transmission granted message (TX-GRANTED) to the first terminal and a transmission demand message (TX-DEMAND) to the second communication system if a communication channel is locally available for the press-to-talk session, wherein locally available is available at the first communication system and at an interface between the first communication system and the second communication system;
- simultaneously to sending the transmission granted message (TX-GRANTED), receiving transmission packets at the first communication system from the first terminal and relaying the transmission packets to the second communication system; and then
- continuing relaying transmission packets to the second communication system if a transmission granted message (TX-GRANTED) from the second communication system in reply to the transmission demand message (TX-DEMAND) at the first communication system is received.

2. The method of claim 1, further comprising:
- continuing relaying transmission packets to the second communication system if a further transmission demand message (TX-DEMAND) from the second communication system having a time stamp value later than a time stamp value in the transmission demand message (TX-DEMAND) forwarded for the first terminal is received.

3. The method of claim 1, further comprising:
- if a further transmission demand message (TX-DEMAND) from the second communication system having a time stamp value earlier than a time stamp value in the transmission demand message (TX-DEMAND) forwarded for the first terminal is received:
  - halting relaying transmission packets to the second communication system;
  - sending a transmission granted message (TX-GRANTED) to the second communication system; and then
  - relaying transmission packets from the second communication system to the first terminal.

4. The method of claim 1, further comprising:
- if a transmission rejected message (TX-REJECTED) from the second communication system is received:
  - halting relaying transmission packets to the second communication system; and then
  - relaying the transmission rejected message (TX-REJECTED) to the first terminal.

5. The method of claim 1, further comprising:
- continuing the PTT session based on priority scheduling if a transmission demand message (TX-DEMAND) from the second communication system having a time stamp value equal to a time stamp value in the transmission demand message (TX-DEMAND) forwarded for the first terminal is received.

6. The method of claim 5, wherein priority scheduling comprises checking priorities assigned to the communication systems serving the initiating terminals associated with the PTT sessions.

7. The method of claim 5, wherein priority scheduling comprises checking priorities assigned to the initiating terminals associated with the PTT sessions.

8. The method of claim 1, wherein at least one message type comprises an identification of the first terminal.

9. The method of claim 1, wherein at least one message type comprises a PTT session reference number.

10. The method of claim 1, wherein the PTT session relates to one of an individual call and a group call.

11. The method of claim 1, further comprising:
- repeating sending the transmission demand message (TX-DEMAND) to the second communication system according to a specific interval.

12. The method of claim 1, further comprising:
- repeating sending the transmission demand message (TX-DEMAND to the second communication system if a transmission granted message (TX-GRANTED) from the second communication system in reply to the transmission demand message (TX-DEMAND) within a time period is not received.

13. The method of claim 12, wherein one of a protocol between the first communication system and the first terminal and a protocol between the second communication system and the second terminal is adapted to the respective air interface.

14. A communication system comprising:
- a first communication system;
- a second communication system operatively connected to the first communication system via a transmission link, wherein the communication system is arranged to:
  - receive a transmission demand message (TX-DEMAND) from the first terminal at the first communication system,
  - send, at the first communication system, a transmission granted message (TX-GRANTED) to the first terminal and a transmission demand message (TX-DEMAND) to the second communication system if a communication channel is locally available for the press-to-talk session, wherein locally available is available at the first communication system and at an interface between the first communication system and the second communication system,
  - simultaneously to sending the transmission granted message (TX-GRANTED), receiving transmission packets from the first terminal at the first communication system and relaying the transmission packets to the second communication system, and then
  - continue relaying transmission packets to the second communication system if a transmission granted message (TX-GRANTED) from the second communication system in reply to the transmission demand message (TX-DEMAND) at the first communication system is received.

15. The communication system of claim 14, wherein the communication system is further arranged to continue relaying transmission packets to the second communication system if a further transmission demand message (TX-DEMAND) from the second communication system having a time stamp value later than a time stamp value in the transmission demand message (TX-DEMAND) forwarded for the first terminal is received.

16. The communication system of claim 14, wherein the communication system is further arranged to:
- halt relay of transmission packets to the second communication system;
- send a transmission granted message (TX-GRANTED) to the second communication system if a further transmission demand message (TX-DEMAND) from the second communication system having a time stamp value earlier than a time stamp value in the transmission demand message (TX-DEMAND) forwarded for the first terminal is received; and then
- relay transmission packets from the second communication system to the first terminal.

17. The communication system of claim 14, wherein the communication system is further arranged to:
- halt relay transmission packets to the second communication system and relay the transmission rejected message (TX-REJECTED) to the first terminal if a transmission rejected message (TX-REJECTED) from the second communication system is received.

18. The communication system of claim 14, wherein the communication system is further arranged to:
- continue the PTT session based on priority scheduling if a transmission demand message (TX-DEMAND) from the second communication system having a time stamp value equal to a time stamp value in the transmission demand message (TX-DEMAND) forwarded for the first terminal is received.

19. The communication system of claim 18, wherein priority scheduling comprises checking priorities assigned to the communication systems serving the initiating terminals associated with the PTT sessions.

20. The communication system of claim 18, wherein priority scheduling comprises checking priorities assigned to the initiating terminals associated with the PTT sessions.

21. The communication system of claim 18, wherein at least one message type comprises an identification of the first terminal.

22. The communication system of claim 18, wherein at least one message type comprises a PTT session reference number.

23. The communication system of claim 18, wherein the PTT session relates to one of an individual call and a group call.

24. The communication system of claim 18, wherein the communication system is further arranged to repeat sending the transmission demand message (TX-DEMAND) to the second communication system in accordance with a specific interval.

25. The communication system of claim 14, wherein the communication system is further arranged to repeat sending the transmission demand message (TX-DEMAND to the second communication system if a transmission granted message (TX-GRANTED) from the second communication system in reply to the transmission demand message (TX-DEMAND) within a time period is not received.

26. The communication system of claim 14, wherein one of a protocol between the first communication system and the first terminal and a protocol between the second communication system and the second terminal is adapted to the respective air interface.

* * * * *